US007950026B1

(12) United States Patent
Urbach

(10) Patent No.: US 7,950,026 B1
(45) Date of Patent: May 24, 2011

(54) VIRTUAL APPLICATION EXECUTION SYSTEM AND METHOD

(76) Inventor: Julian Michael Urbach, Valley Village, CA (US)

( * ) Notice: Subject to any disclaimer, the term of this patent is extended or adjusted under 35 U.S.C. 154(b) by 1111 days.

(21) Appl. No.: 11/166,663

(22) Filed: Jun. 23, 2005

Related U.S. Application Data

(60) Provisional application No. 60/583,182, filed on Jun. 24, 2004.

(51) Int. Cl.
*G06F 9/44* (2006.01)
(52) U.S. Cl. ........ 719/329; 715/733; 715/751; 715/753; 715/759
(58) Field of Classification Search ................. 717/136; 709/218, 231
See application file for complete search history.

(56) References Cited

U.S. PATENT DOCUMENTS

| | | | |
|---|---|---|---|
| 6,285,363 B1 * | 9/2001 | Mairs et al. .................... 715/751 |
| 6,654,784 B1 * | 11/2003 | Wei ............................... 709/203 |
| 6,697,088 B1 * | 2/2004 | Hollander ...................... 715/744 |
| 6,734,873 B1 * | 5/2004 | Herf et al. ...................... 345/629 |
| 6,968,507 B2 * | 11/2005 | Pennell et al. ................. 715/781 |
| 7,170,526 B1 * | 1/2007 | Johnson ......................... 345/582 |
| 2002/0049852 A1 * | 4/2002 | Lee et al. ....................... 709/231 |
| 2005/0223100 A1 * | 10/2005 | Chen et al. ..................... 709/228 |

OTHER PUBLICATIONS

Robert W. Scheifler, Jim Gettys, The X window system, ACM Transactions on Graphics, vol. 5, Issue 2 (Apr. 1986), pp. 79-109.*
Maarten van Dantzich, Vadim Gorokhovsky, George Robertson, Application redirection: hosting Windows applications in 3D, New Paradigms in Information Visualization and Manipulation: Proceedings of the 1999 workshop on new paradigms in information visualization and manipulation, Nov. 2-6, 1999, pp. 87-91.*

* cited by examiner

*Primary Examiner* — Hyung S Sough
*Assistant Examiner* — Kimberly Jordan
(74) *Attorney, Agent, or Firm* — Baker Botts L.L.P.

(57) ABSTRACT

A virtual execution environment for software applications and other code objects. In one implementation, the present invention allows for virtual execution of applications by transparently capturing the rendered output of natively executed applications, and delivering the output to other processes on the same platform or to remote devices in a platform agnostic manner.

26 Claims, 9 Drawing Sheets

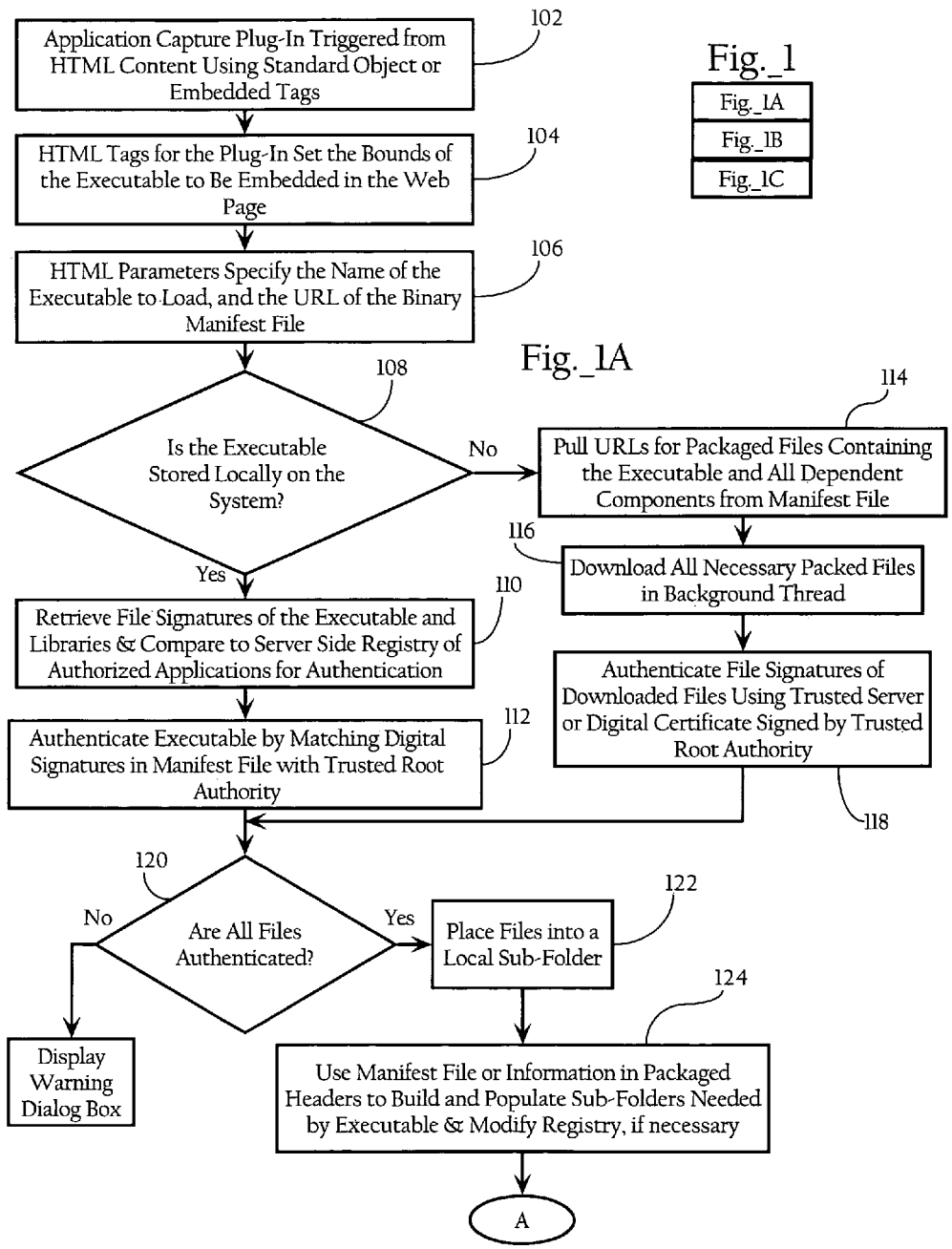

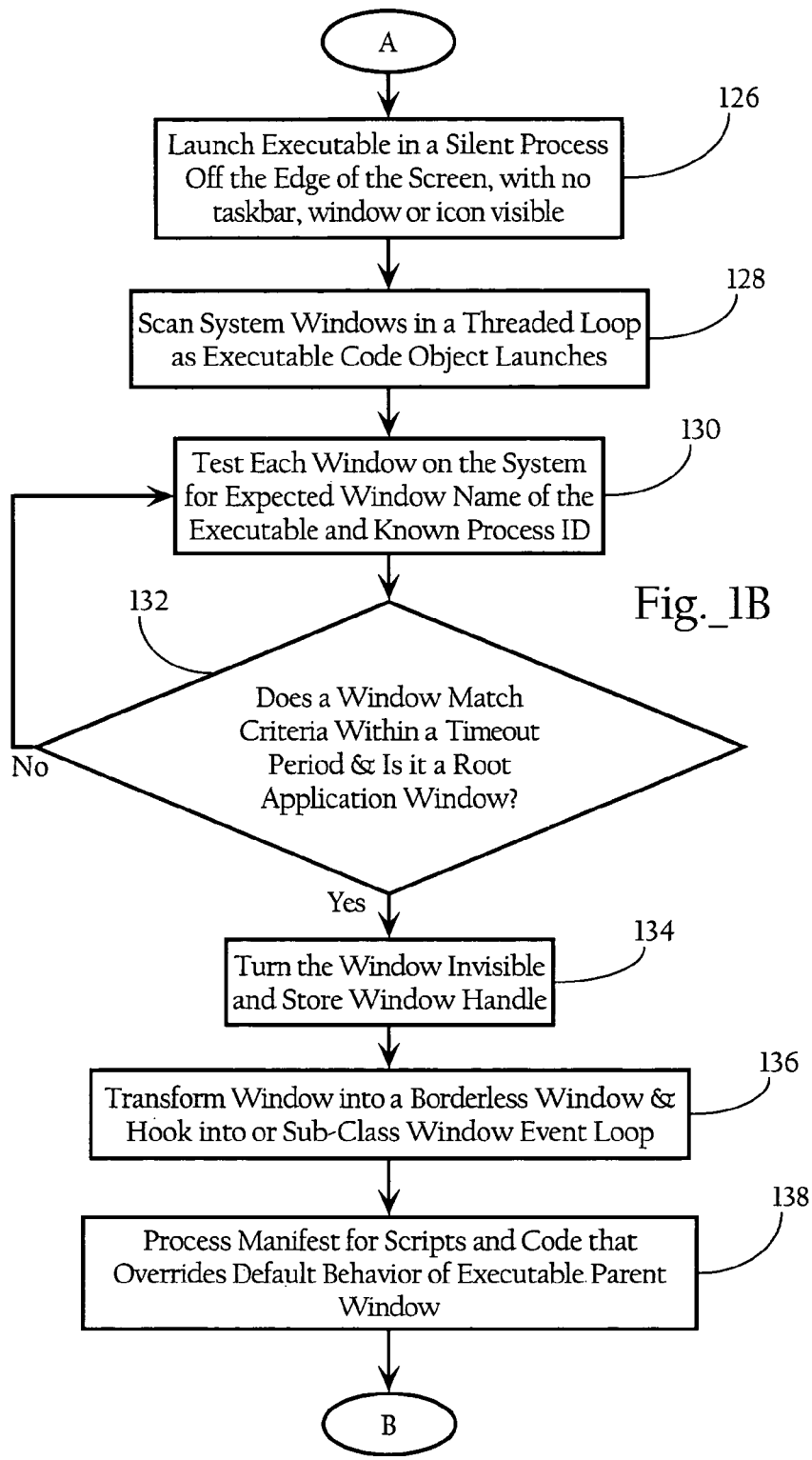
Fig._1B

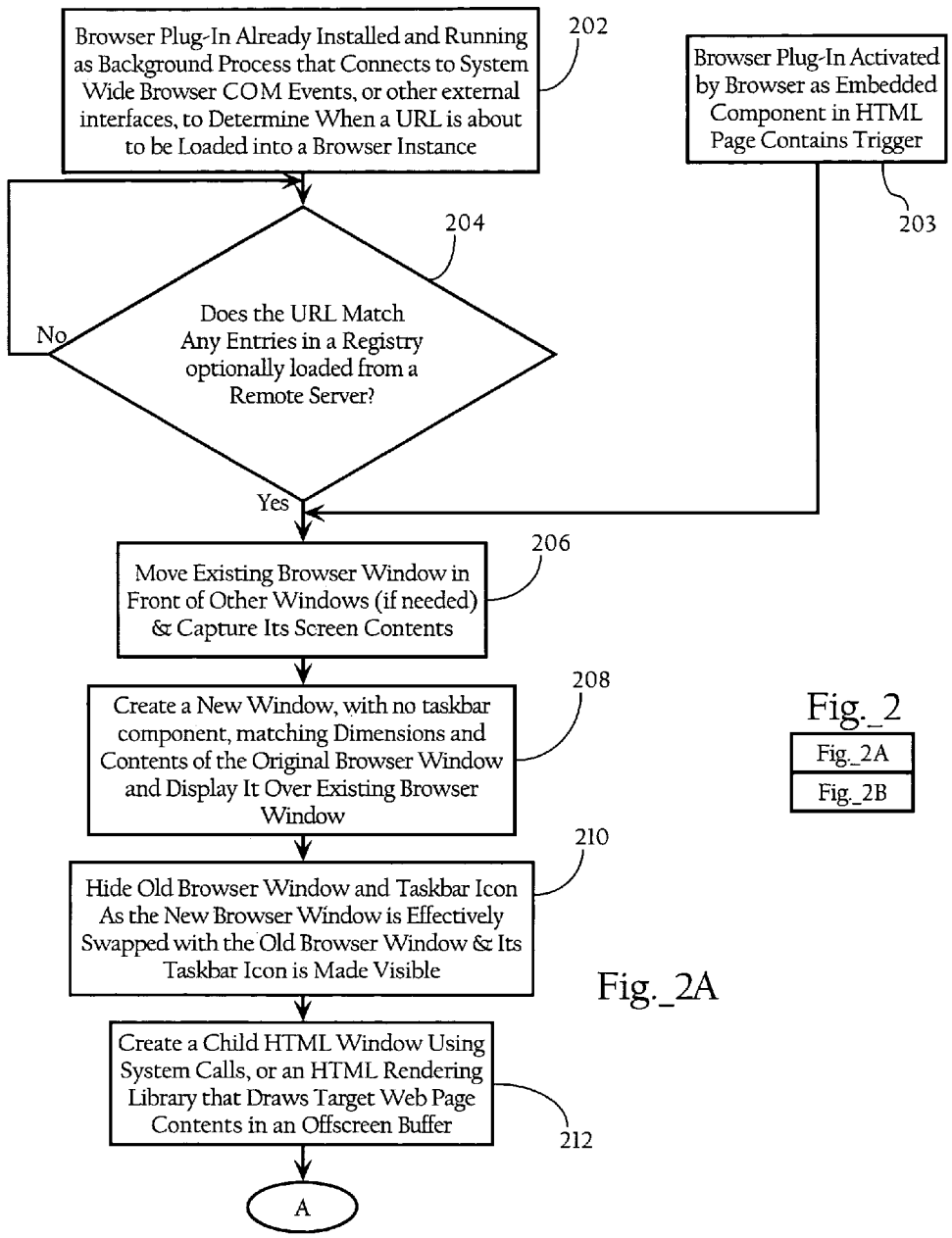
Fig._2A

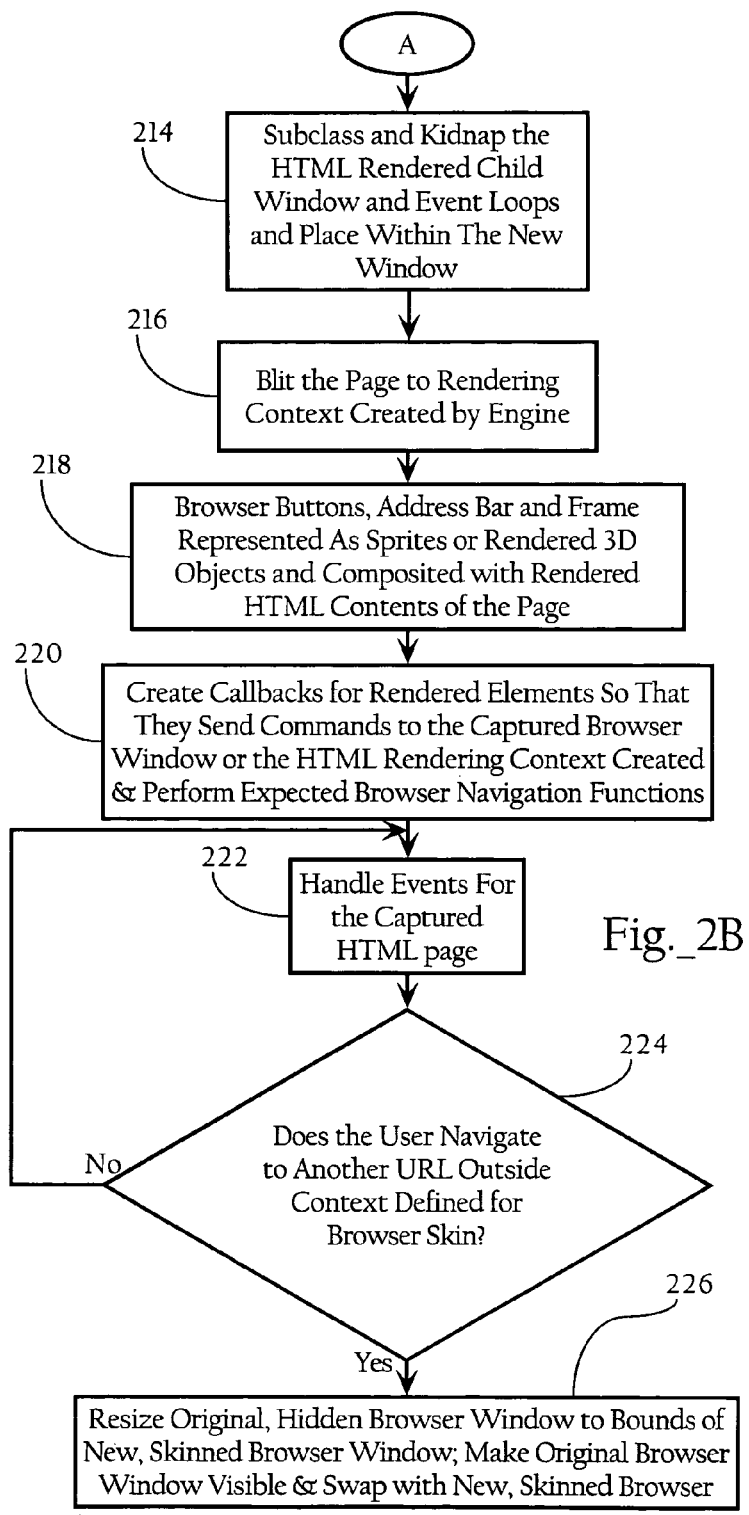
Fig._2B

Fig._4

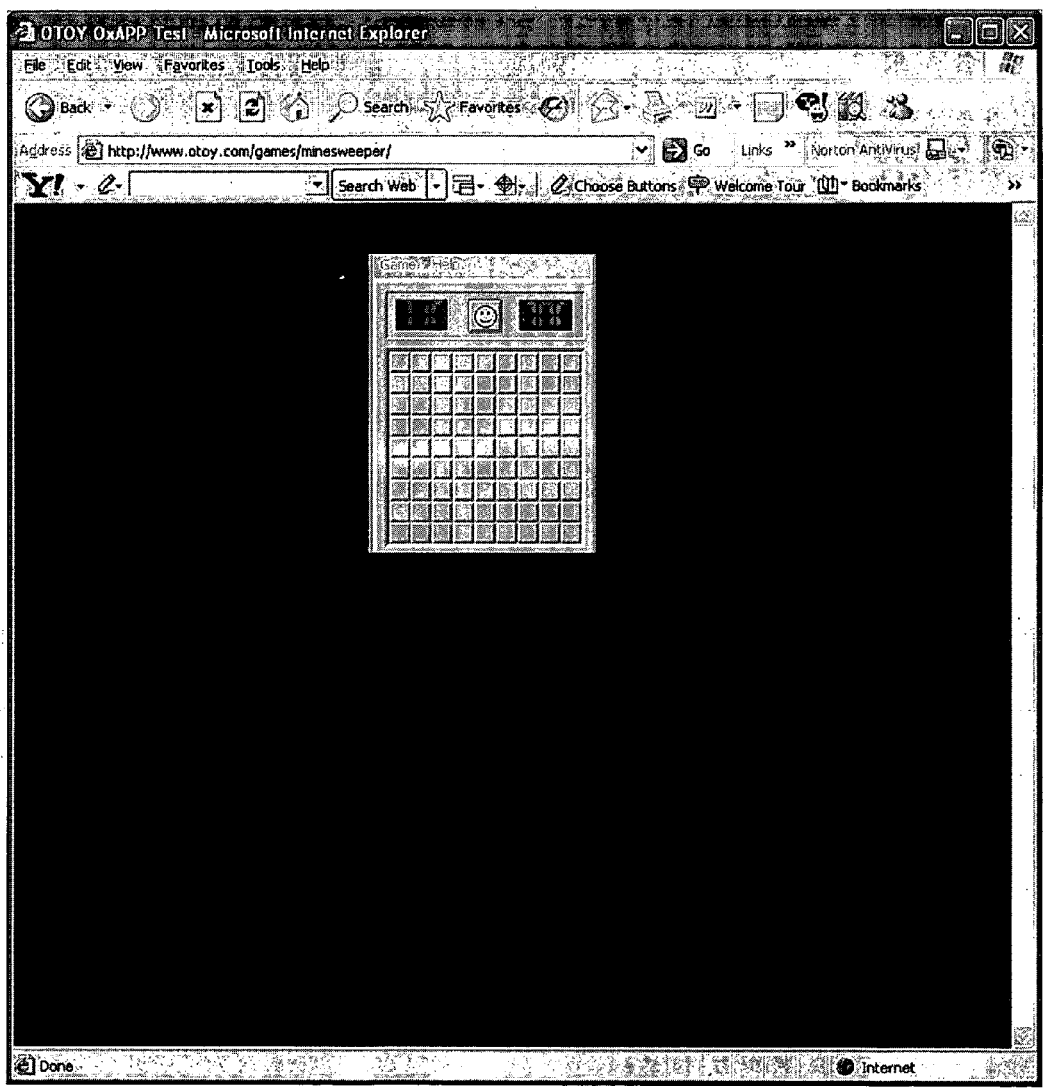
Fig._6

VIRTUAL APPLICATION EXECUTION SYSTEM AND METHOD

CROSS-REFERENCE TO RELATED APPLICATIONS

The present application claims priority from U.S. provisional patent application Ser. No. 60/583,182 filed Jun. 24, 2004, which is incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to computer software and, more particularly to methods, apparatuses and systems directed to virtual execution environments for software applications.

BACKGROUND OF THE INVENTION

The emergence of distributed computing environments and associated technologies, such as web services, wireless networks, and the like poses a genuine challenge to the traditional deployment of software applications. What is missing between the two poles of locally-deployed, compiled applications and distributed applications operating over a network has been a cohesive framework that allows developers to deploy software applications with the complexity and richness of compiled executables, while retaining the platform independence and thinness of content and applications for web browsers or other thin hosting environments.

SUMMARY OF THE INVENTION

The present invention provides methods, apparatuses and systems directed, in one implementation, to a virtual execution environment for software applications and other code objects or data blocks. In one implementation, the present invention allows for virtual execution of applications by transparently capturing the rendered output of natively executed applications, and delivering the output to other processes on the same platform or to remote devices in a platform agnostic manner. The present invention allows for an unprecedented mixing of thin applications in a distributed computing environment, such as a peer-to-peer system, with a rich API that makes no differentiation between the client and server nodes and has no dependency on the underlying operating system. Implementations of the present invention bridge the power of compiled applications with the thinness of web media. In some implementations, the present invention allows for the ability to run content as meta-applications on devices without the runtime engine being present locally on the client device. The present invention, in one implementation, also features mechanisms that facilitate the dissemination, across one or more remote hosts, of runtime engine code that incorporate the functionality described herein. The present invention can be applied in a variety of contexts including interactive systems—such as, computer gaming systems, three-dimensional graphical user interfaces, messaging systems, etc.—or passive systems, such as multi-media presentations, animations, and the like. The present invention also has application to stand-alone computing devices, or networked computing systems. These and other objects of the present invention will become apparent from the drawings and following description.

DESCRIPTION OF THE DRAWINGS

FIGS. 1, 1A, 1B, and 1C are a flow chart diagram setting forth a method, according to one implementation of the present invention, directed to the hosting of an executable or native application within the context of a browser or any other application that can render web media.

FIGS. 2, 2A, and 2B are a flow chart diagram showing a method, according to one implementation of the present invention, directed to the skinning of browsers customized to one or more URLs.

FIG. 6 is graphical user interface of a browser that includes the captured output of an application rendered therein.

DESCRIPTION OF PREFERRED EMBODIMENT(S)

Figure 1C:
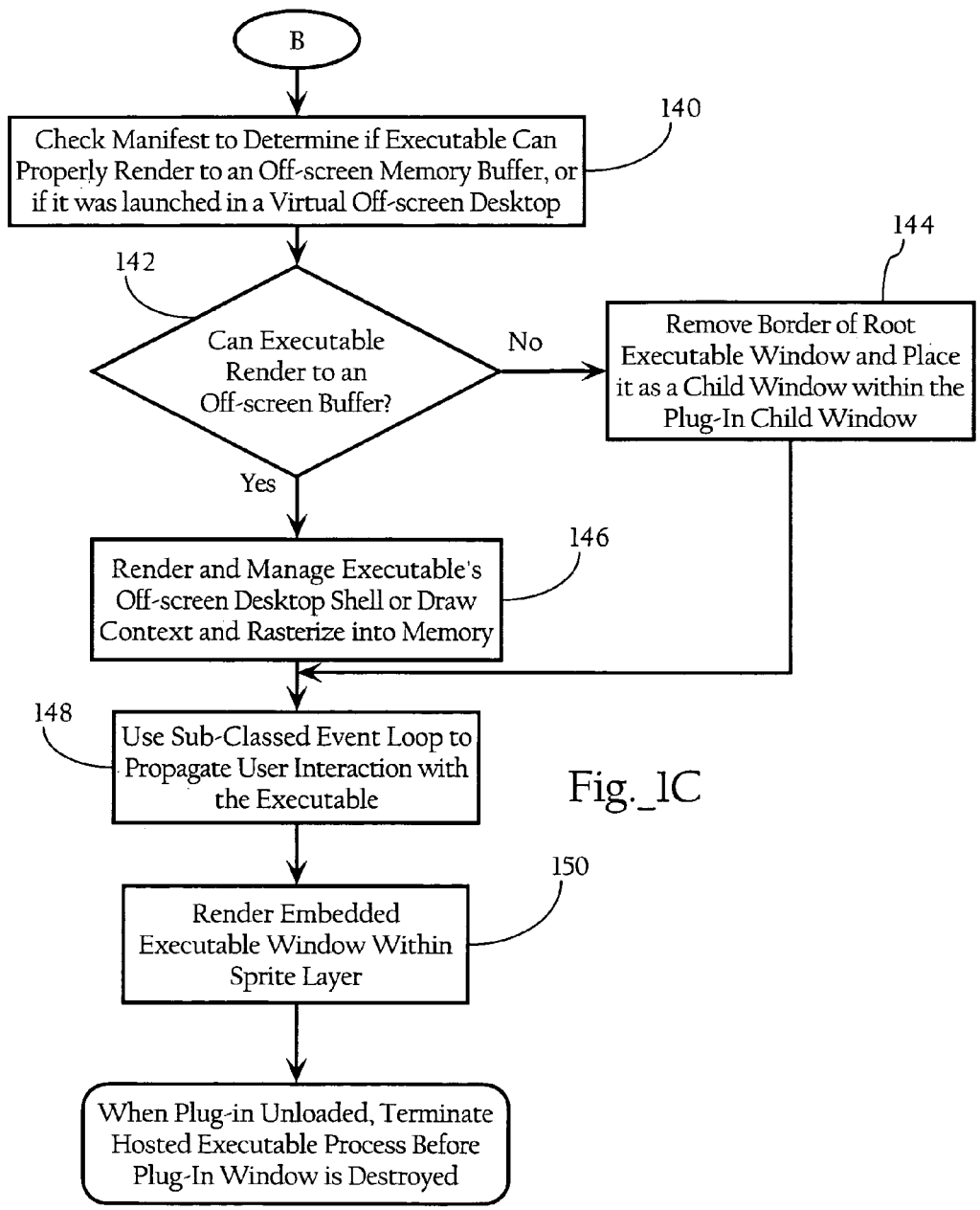

As described herein, the virtual application execution system can be configured to accomplish a variety of functions and can operate as an independent process or within the context of myriad applications, such as games, browser clients, instant messaging clients, email clients, and the like. In one implementation, the virtual application execution system is a software application executed on a general-purpose computer. The virtual application execution system may be implemented in a variety of forms. For example, it may be distributed as a stand-alone application, or as a plug-in to another application, such as a browser, email, or instant messaging client. In addition, the software may be distributed as a download or on a computer readable medium, such as a CD, or DVD. The virtual application execution system functionality according to the present invention can be incorporated into, and/or operate with, a variety of computing platforms, such as game boxes, handheld devices, and the like.

In one implementation, the virtual application execution system is a software engine, embodied in a runtime library built using C/C++ and assembly language. Of course, other programming languages can be used. The virtual application execution engine can be distributed as a plug-in—such as a browser or IM client plug-in—, or as an independent executable. In one implementation, the virtual application execution engine comprises a virtual machine that interprets scripts, uses its own virtual desktop and file system (which can wrap around local native file streams or raw socket connections) and includes a rendering engine that performs all rasterization (and in some embodiments, encryption and compression). As discussed in more detail below, the virtual application execution engine may also include other functionality, such as HTTP or web server functionality, instant message (IM) functionality and the like.

In one implementation, when content intended for the virtual application execution engine is selected, such as when a user clicks on a link to the content in a web page, the virtual application execution engine, if not already installed on the system, installs itself through a stub mechanism. The runtime stub manages all platform specific calls made by the runtime engine. In one implementation, the remainder of the virtual application execution engine, above the stub layer, is self-contained and portable across a variety of platforms. In one implementation, the runtime stub is installed from a URL (in a web page, email, document, or instant message) that references runtime content. The stub can be distributed in a variety of forms, such as a web browser plug-in, an executable, media codec, QuickTime plug-in, Netscape plug-in, ActiveX control, Shockwave Xtra, etc. In one implementation, the runtime stub is operative to check the digital signatures for all remaining runtime libraries and components that it loads.

As described herein, the virtual application execution engine allows for virtual execution of applications by transparently launching and capturing the rendered output of natively executed applications, and delivering the output to other processes on the same platform or to remote devices in a platform agnostic manner (such as through an HTTP stream). For example, the virtual application execution engine can be configured to launch an executable within the context of an operating system platform and render the output to a browser client executed on the same platform. In one implementation, the output can be rendered to allow the user to interact with the virtually executed application within the context of the browser client as if it were a native embeddable object within a web page. In another implementation, the virtual application execution engine can be configured to dynamically re-skin a browser client in response to a selected uniform resource locator (URL). In yet another embodiment, in one implementation, the virtual application execution engine, when executed on a computing device, can be a node in a distributed computing environment, such as a peer-to-peer network, which can be used for data or file sharing, and virtual hosting of applications for thin clients that do not have the runtime or other functionality to execute a desired application.

The virtual application execution engine, in one implementation, can operate in two modes depending on the nature of the application to be executed. For example, the virtual application execution engine can operate on an application package comprising, the binary executable corresponding to an application, and a script (executed by the virtual machine of the virtual application execution engine) defining the instructions for launching the binary executable. In such an implementation, the virtual application execution engine silently launches the binary executable as a native process, captures the output and input channels to the binary executable, and renders and directs the output of the executable as desired. In a second mode, the application to be executed supports Microsoft's COM or other suitable interface. In this second mode, the virtual application execution engine launches the application as a COM process, captures the rendered output of the COM process, and directs the rendered output as desired.

A. Virtual Execution of Software Applications or Executable Objects

As discussed herein, executables (*.exe) or other native application files and code objects can be launched into a process controlled by the virtual application execution engine, and appear directly within a window corresponding to the engine, or routed into another application, such as a frame within a web page. For example, implementations of the present invention can be configured to achieve the result illustrated in FIG. 6. That is, the hosting of an executable within the context of a browser window. The virtual application execution engine, in one implementation, can capture a binary stream characterizing the display output of an executable and re-route it. For example, the virtual application execution engine can unpack an application, and launch the executable silently, kidnapping its output for the above use using the method shown in the code set forth below.

In implementations, where the virtual application execution engine is implemented as a browser plug-in, native applications can be executed within the context of a browser. As FIG. 1 (comprising FIGS. 1A, 1B & 1C) illustrates, local execution of a native application within the context of a browser can be triggered by a web page including standard objects or embedded tags (102). In one implementation, the HTML tags set the bounds of the executable to be embedded in the HTML page (104). As FIG. 1 illustrates, the HTML parameters of the page may also specify the name of the executable to load and the URL of a binary manifest file (106). If the executable is stored locally on the computing system (108), the virtual application execution engine can authenticate the executable and libraries by comparing corresponding file signatures with a server-side registry of authorized applications (110). In one implementation, the virtual application execution engine authenticates the executable by matching one or more digital signatures in the manifest file with a trusted root authority (112).

If the executable is not stored locally, the virtual application execution engine pulls, from the manifest file, the URLs for the packaged files contain the executable and all dependent components (114), and downloads all necessary packed files in a background thread (116). As FIG. 1 illustrates, the virtual application execution engine then authenticates the file signatures of the downloaded files using a trusted server or digital certificate(s) signed by a trusted root authority (118). If the files are not authenticated (120), the virtual application execution engine displays a warning dialog box, and can optionally suppress the launch of the application. Otherwise, the virtual application execution engine places the files into a local sub-folder (122), and uses the manifest file or information in the package headers to build and populate sub-folders need by the executable, as well as modifying the system registry if necessary (124).

After authentication of the files, the virtual application execution engine launches the executable in a silent process within the context of the native operating system (126). In many operating systems (such as Microsoft Windows®), a variety of objects are created to support the launched process, such as a parent or root window (identified by a window handle), as well as window event loops or processes that scan for user inputs (e.g., key strokes, mouse inputs, etc.) intended for the process. Together, the window and corresponding event loops are the input/output interface to the launched process. In one implementation, the process is operative to render a display output as a binary data stream and provides the rendered output to the window created for it by the operating system. As described herein, the virtual application execution engine, in one implementation, intercepts the channel between these interfaces and the underlying process to virtually execute the subject executable within other contexts, such as within a browser client. In one implementation, the virtual application execution engine launches the process off the edge of the display area with no visible task bar, window or icon visible to the user. The virtual application execution engine then scans the system windows of the native operating system in a threaded loop as the executable code object is launched (128). During this loop, the virtual application execution engine tests each window on the operating system for an expected window name and a known process identifier returned by the operating system when the process was launched (130). As FIG. 1 illustrates, if the virtual application execution engine finds a window that matches these two criteria and is a root application window (132), it turns the window invisible to the user and stores the window handle corresponding to the window (134). Additional or alternative criteria that can be used to identify the window corresponding to the silently launched process include thread handles, module names, class names, and the like. In one implementation, the virtual application execution engine changes at least one window property (e.g., the procedure pointer in Microsoft OSs) created by the operating system when launching the process that allows the virtual application execution engine to capture the rendered output of the process and divert it as desired, such as rendering it to an off-screen buffer. For example, in Microsoft platforms, the virtual application execution engine changes the procedure pointer of the captured process from the window handle assigned by the operating system to another procedure pointer created by the virtual application execution engine to allow the virtual application execution engine to control, render and process events for the captured application. As FIG. 1 further illustrates, the virtual application execution engine, in one implementation, transforms the launched process' window into a borderless window and hooks into, or sub-classes, the window event loop (136) in order to intercept, as well as write, key strokes, mouse clicks and other inputs intended for the process. The source code set forth below illustrates how the virtual application execution engine launches an executable and scans for a corresponding window created by the underlying operating system.

As FIG. 1 shows, the virtual application execution engine processes the manifest file for scripts and code that may override the default behavior of the executable parent window originally created by the operating system and hidden by the virtual application execution engine (138). For example, the virtual application execution engine, consulting a script, can change the dimensions of the window created by the virtual application execution engine, background colors, scroll bars, etc. In one implementation, the virtual application execution engine checks the manifest to determine if the executable can properly render to an off-screen memory buffer, or if the executable was launched in a virtual off-screen desktop or in the context of a hidden display device (140). If the executable can render to an off-screen buffer (142), the virtual application execution engine renders and manages the executable's off-screen desktop shell or draws its context and rasterizes it into an off-screen buffer (146). Otherwise, the virtual application execution engine removes the border of the root executable window of the captured process and inserts it as a child window within another window managed by the virtual application execution engine (144). As FIG. 1 also illustrates, the virtual application execution engine uses the sub-classed event loop to propagate user interaction to the native process corresponding to the executable (148). That is, the virtual application execution engine receives user interaction (e.g., mouse clicks, key strokes, etc.) within the context of its window event loops, translates the event data as required (e.g., converting from 3D to 2D space, etc.), and writes it to the event loops of the process launched for the hosted executable. The virtual application execution engine then renders the embedded executable child window within a surface or sprite layer of the rendering context of the virtual application execution engine (150). For example, in one implementation, the resulting rendered output stored in the off-screen, memory buffer, or the output rendered into the child window, is placed inside the context of a browser application, or any other application that processed and launched the URL. The subclassed (captured) process can then digest the user interaction, the results of which the virtual application execution engine captures and renders within a destination display context such as a browser client window. Finally, when the plug-in is unloaded, the virtual application execution engine terminates the hosted executable process before the plug-in window is destroyed.

As discussed above, other implementations are possible. For example, if the executable supports a COM or other suitable interface, the virtual application execution engine looks for a COM interface supported by the executable, and accesses the executable through its COM interface to potentially access additional information or other functionality not available through the normal event message pipeline. For example, the virtual application execution engine can query the COM interface of a process to determine whether the COM interface can be used to render the output of the process to an off-screen buffer, get and receive event messages, and the like. The virtual application execution engine, depending on the properties of the COM process, can then capture its output, in a manner similar to that discussed above, and direct the output as desired. Similar to the foregoing, the resulting output rendered by the executable, in one implementation, is diverted into an off-screen buffer and eventually blitted into the rendering context of the virtual application execution engine. Of course, other application interfaces for external processes can be used, such as Java interfaces, .NET interfaces, Applescript interfaces, and the like.

B. Web Browser Skinning

In one implementation, the present invention facilitates the skinning of browsers in a manner specifically configured or customized by a given web site. For example, Netscape used to give away themed browsers, having a customized skin, to promote a particular movie. The present invention takes this a step further, by automatically re-skinning the browser when a URL with HTML containing skin tags (or a URL matching a predetermined domain) is loaded (either through a link, or by typing the URL into the browser address bar). Further, when the URL is exited, the virtual application execution engine restores the normal skin of the browser, and can maintain different skins for each browser instance. On Microsoft Windows® platforms, the virtual application execution engine can use COM event sinks, or other external connections, in Internet Explorer® (IE) to capture the window handle of the browser, and pull the inner HTML control from the IE window, and place it in a new window with the same dimensions as the normal browser using the URL's skinning information. The original browser window is hidden until the page is exited, at which point the inverse of the above is performed, with the HTML browser control being swapped back into the original frame. The virtual application execution engine can also leave the existing browser page alone and achieve a cross fade or animated transition to the themed browser skin by taking a snapshot image of the browser window, launching a completely new window with this image over the browser and then hiding the browser window. Since the browser's display is being pulled from an image map maintained by the virtual application execution engine, already skinned and framed, the rendered HTML control can directly be blended into the image map, creating a seamless transition from the normal OS browser to the themed variation rendered by the virtual application execution engine. Furthermore, the virtual application execution engine automatically propagates these enhancements (as plug-ins) within the client web browser, allowing the browser to 1) transparently host clipped executables (above) in a web page (as if they were a native browser plug-in), and 2) re-skin the browser's borders, icons and buttons based on the currently viewed URL.

FIG. 2 illustrates a method directed to skinning a browser with custom content as implemented by a browser plug-in that is triggered by an embedded tag or other object in an HTML page. As FIG. 2 illustrates, the browser itself can launch the plug-in virtual application execution engine upon detection of an embedded tag or component in an HTML page (203). Alternatively, the virtual application execution engine can already be installed and running as a background process that connects to system-wide browser COM or DOM (Document Object Model) events to determine whether to launch the browser skinning functionality described herein based on the URL currently loaded by any of the foregoing browser instances (202). In this mode of implementation, the virtual application execution engine, in one implementation, determines whether the URL, loaded by any current browser instance, matches an entry in a registry, which may be hosted by a remote server or stored locally (204). If a match is found, the virtual application execution engine launches the functionality described herein.

In one implementation, the virtual application execution engine moves the existing browser window in front of all other windows, if necessary, and captures its screen contents in an off-screen buffer (206). The virtual application execution engine then creates a new window (in one implementation, with no taskbar component), that matches the dimensions and contents of the original browser window and displays it over the bounds of the original browser window (208). The virtual application execution engine, in one implementation, hides the original browser window and taskbar icon as the new window is seamlessly swapped for it and becomes visible (210).

The virtual application execution engine, in one implementation, creates a child OS window within the rendering context of the virtual application execution engine using standard system calls, or calls to an HTML rendering library that draws the target web page contents to an off-screen buffer (212). As discussed above, the virtual application execution engine may also use hidden display or virtual desktop graphics contexts to achieve the effect of rendering the web page to an off-screen buffer. Of course, other graphics contexts controlled or controllable by the virtual application execution engine can be used. The virtual application execution engine then subclasses and kidnaps the HTML-rendered child window and renders it within the newly created window managed by the virtual application execution engine (214). In another implementation, subclassing of the event and message loops can be replaced or enhanced, if the browser supports a COM or similar external application interface. The virtual application execution engine, if the target web page is rendered to an off-screen buffer, then blits the rendered page from the off-screen buffer to the rendering context created by the virtual application execution engine (216). If the rendered target page is placed in a virtual desktop graphics context, the virtual application execution engine can either blit the target page directly from the virtual graphics context, or copy the target web page into the off-screen buffer, and then blit the page to the rendering context of the virtual application execution engine. For example, the virtual application execution engine may include a 3-dimensional rendering engine. In such an embodiment, the rendered page may be converted to a composited texture map and rendered on the surface of a desired 3-dimensional object. In another implementation, the page may be simply blitted into a 2-dimensional area surrounded by the skinned browser components created by the virtual application execution engine. As FIG. 2B illustrates, the virtual application execution engine then renders the browser buttons, address bar, and frame and composites them with the rendered HTML contents of the page (218). To properly handle events, the virtual application execution engine creates and handles callbacks from the rendered elements of the page so that commands can be sent to the captured browser window or HTML rendering context, and performs browser navigation functions as a user clicks within the window or other context presented by the virtual application execution engine (220). As FIG. 2B shows, the virtual application execution engine handles events such as mouse clicks and keyboard strokes (222) in this manner until the user navigates to a URL that is outside the context defined for the browser skin (224). After the user navigates outside this context (which can be specified in a script) or the URL domain used to load the skin, the virtual application execution engine resizes the original, hidden browser window to the bounds of the skinned browser window and makes the original browser window visible, swapping it with the skinned browser window (226).

C. Shared Windows and Remote Application Hosting

Figure 3:
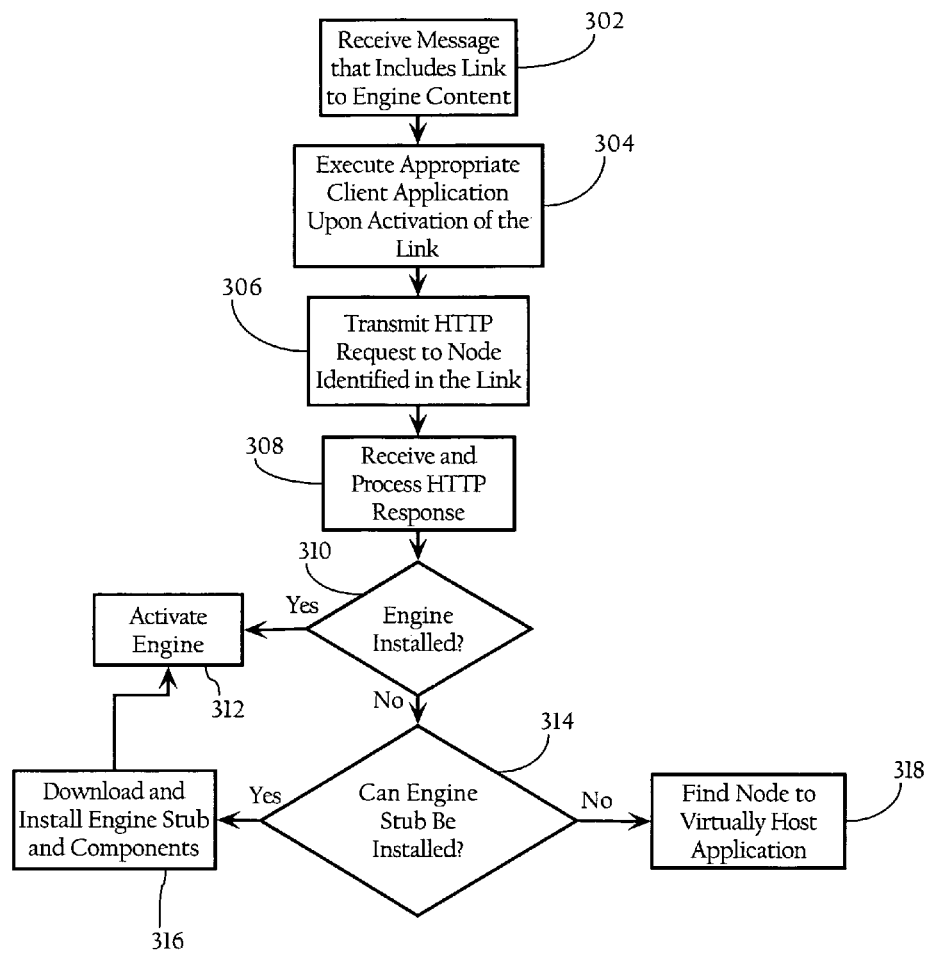
FIG. 3 is a flow chart diagram showing the dissemination of a runtime stub, according to an implementation of the present invention.

In one implementation, elements maintained and rendered by the virtual application execution engine on a local client can be transmitted and rendered remotely onto other clients. This functionality can be used to accomplish a variety of objectives, such as remote application hosting and/or shared window sessions. Shared windows and remote application hosting can be accomplished in two different manners. For example, an instant messaging, chat, or email message can be used to virally disseminate the virtual application execution engine stub to a remote client. That is, as discussed below, in one implementation, the virtual application execution engine can install its runtime on the remote host, and use it to establish a window for the shared application on the remote host. In another implementation, each virtual application execution engine runtime, when executed on a computing device, can become a node in a peer-to-peer network, which can be used for data or file sharing, and virtual hosting of applications for thin clients that do not have the runtime or other functionality to execute a desired application. Accordingly, through a standard TCP/IP or other network protocol connection, two or more nodes can be linked to a shared virtual window, with each node viewing and interacting through a local viewport to the shared window space or context. FIG. 3 illustrates a process flow implemented on a remote client in response to a message that includes a link to content corresponding to the virtual application execution engine. For example, using an IM gateway (such as a TOC session socket connection, SMS messaging system, or server IM proxy) built into the virtual application execution engine, a user may send a single URL link (or other reference trigger) to the remote client in a message. When the remote client receives the message (302), the user may activate the link, causing the remote client to launch an appropriate client application (304), such as a web browser, microbrowser, etc., which transmits a request to the node identified in the link (306). The target node may be a server or node different/remote from the virtual application execution engine that originally sent the link, or may be the same (originating) node that originally sent the link. In either implementation, the sent link is interpreted by an automated web server or other server node in the network, when the remote client clicks on it. The server node, which receives the request, generates an HTTP (or other device agnostic) response and sends it to the remote client. In one implementation, the HTTP or other response comprises an HTML stream that includes a script with logic triggers executed by the remote client that conditionally launch various process flows based on the presence of a virtual application execution engine on the remote client and/or the ability to install an engine stub on the remote client.

As FIG. 3 illustrates, when the remote client receives and processes the HTTP response (308), the script (or other code object) in the response first checks for the presence of a virtual application execution engine installed on the remote client (310). If the virtual application execution engine is present, the script activates the virtual application execution engine on the remote client (312), which then operates in a similar manner as that discussed above. For example, the virtual application execution engine may launch as a browser plug-in on the remote client, consult a script and install an executable code object embedded in the HTTP response (see above). In addition, a shared window or session may be established, as described in more detail below, where the virtual application execution engine on the remote client and the originating host synchronize the events at each node in the shared session. If the virtual application execution engine is not installed on the remote client, however, the script in the HTML received by the remote client first attempts to download and install an engine which transparently installs the virtual application execution engine runtime (316) and uses the generated HTML parameters passed to the browser plug-in (or other interface to the engine on the client) to host an executable code object and/or establish a shared window between each client. In one implementation, the runtime install can occur with just a few clicks from the remote user, even if it does not yet have the virtual application execution engine installed before a first connection is established. This allows the viral dissemination of both the virtual application execution engine runtime code and its managed content with almost no installation or action required on the part of the remote user (e.g., one to click on the link sent in an IM, the other to accept the installation of the apparatus' browser plug-in, which can take the form of a stub ActiveX control on a PC, or a QuickTime component or Shockwave Xtra on the Mac).

Assuming that the originating node and the remote client both have runtime engines installed, the shared window session processes, such as event and rendering synchronization, is greatly facilitated and can be implemented using standard technologies, such as technologies in the network gaming environment. For example, the remote client and originating host can send smaller representations of complex structures, such as the drawing context or transforms of objects or state rendering changes. For example, one node may simply send position or vector data for a given 3-dimensional object as opposed to having to send information encapsulating the entire rasterization of the object on the local client.

As FIG. 3 illustrates, if the remote client does not support the engine stub (314), the script or other parameters in the HTTP response attempts to find a node in the network environment, such as the originating node, that can virtually host the application and/or shared window session (318). In another implementation, however, the remote client may rely on functionality native to the original server's network environment itself, such as a peer-to-peer network to identify a node that can host the application or shared window session. In one implementation, this functionality could be triggered by a timeout at the remote client, after the application failed to execute within a threshold period of time.

As discussed above, the virtual application execution engine can also operate to virtually host an application and/or establish a shared window (in one implementation, rendered as an HTML page, including image maps, Javascript events and triggers, etc.) with thin clients that cannot support the engine runtime stub. To support shared window sessions, the virtual application execution engine can translate application events and logic, local to the hosting node, into an HTTP stream destined for the remote client. User interaction (such as Javascript events, image map events, and changes to text fields) at the remote client are transmitted back to the virtual application execution engine on the hosting node (in one implementation, through HTTP streams), and translated into local events and written to the event loop(s) of the shared process(es). In addition, some events on the remote client can be generated by the Javascript or other code in the HTTP stream, such as automatic refreshing of pages, timeouts, mouse events, keyboard events, etc. Translation of the local events into HTTP streams, for example, essentially results in abstraction of these events that can be configured to achieve a variety of features and objectives. For example, an input device (e.g., a joystick, keyboard or other I/O device) expected by the process (executed on the hosting node) that does not physically exist on the remote client can be nevertheless simulated. For example, the virtual application execution engine can convert image map inputs from the remote client in a response HTTP stream to equivalent joystick or keyboard input and write or transmit the converted inputs to the process executed on the hosting node. The virtual application execution engine can also convert any static or editable content in the hosted process (e.g., text, fields, sprites, arrays, labels, buttons, etc.) into equivalent HTML structures (e.g., tables, HTML layers, tagged objects, canvases, scripts, and Java applets) for transmission to, as well as consumption and synchronization by, the remote client. In, one implementation, however, the virtual application execution engine can simply transmit non-interactive images (such as JPEGs and GIFs) of the rasterized application context on the host.

For example, a cell phone running a microbrowser client can connect to another node that includes a virtual application execution engine runtime and a word processing or spreadsheet application. The virtual application execution engine runtime can create an interface to a document with full event synchronization that works with the microbrowser on the cell phone and transmit it to the cell phone. For example, the virtual application execution engine can be used to host a spreadsheet program (with support for COM or other external application interfaces), as described above, capture the rendered output of the spreadsheet program, and create a page including the rendered output as an HTML table that has been translated from accessing the column and row properties of the spreadsheet through its COM or other external interface. A link to the page can then be transmitted to the cell phone in an instant message. The virtual application execution engine includes HTTP hosting and/or other server functionality that translates/transcodes and serves the page to the cell phone when the link is activated. User interaction on the cell phone is transmitted to the virtual application execution engine server in a manner similar to normal HTTP sessions. The virtual application execution engine receives the input and translates it to a standard windows event and writes it to the event loop of the local process corresponding to the spreadsheet. The resulting output can be rendered on the local node, as well as transmitted to the cell phone's microbrowser. Accordingly, the virtual application execution engine, in effect, translates the output of a locally executed process, such as a graphics context, events, etc. into an HTML over HTTP stream. In addition, the remote user's input is transmitted back to the virtual application execution engine as HTTP messages. For example, in one implementation, the resulting rendered output stored in the off-screen memory buffer may be converted into a JPEG, GIF or other suitable image file and displayed within the context of a remote client. In another implementation, the rendered output can be converted into an image map (or editable HTML field or table) and displayed within the context of a remote browser: The virtual application execution engine can also convert the mouse clicks on the image map (or edits to input, fields or table objects) to corresponding events and write them to the event loop corresponding to the host process implementing the executable. The host process can then digest the user interaction, the results of which the virtual application execution engine captures, renders and transmits to the remote client.

Figure 4:
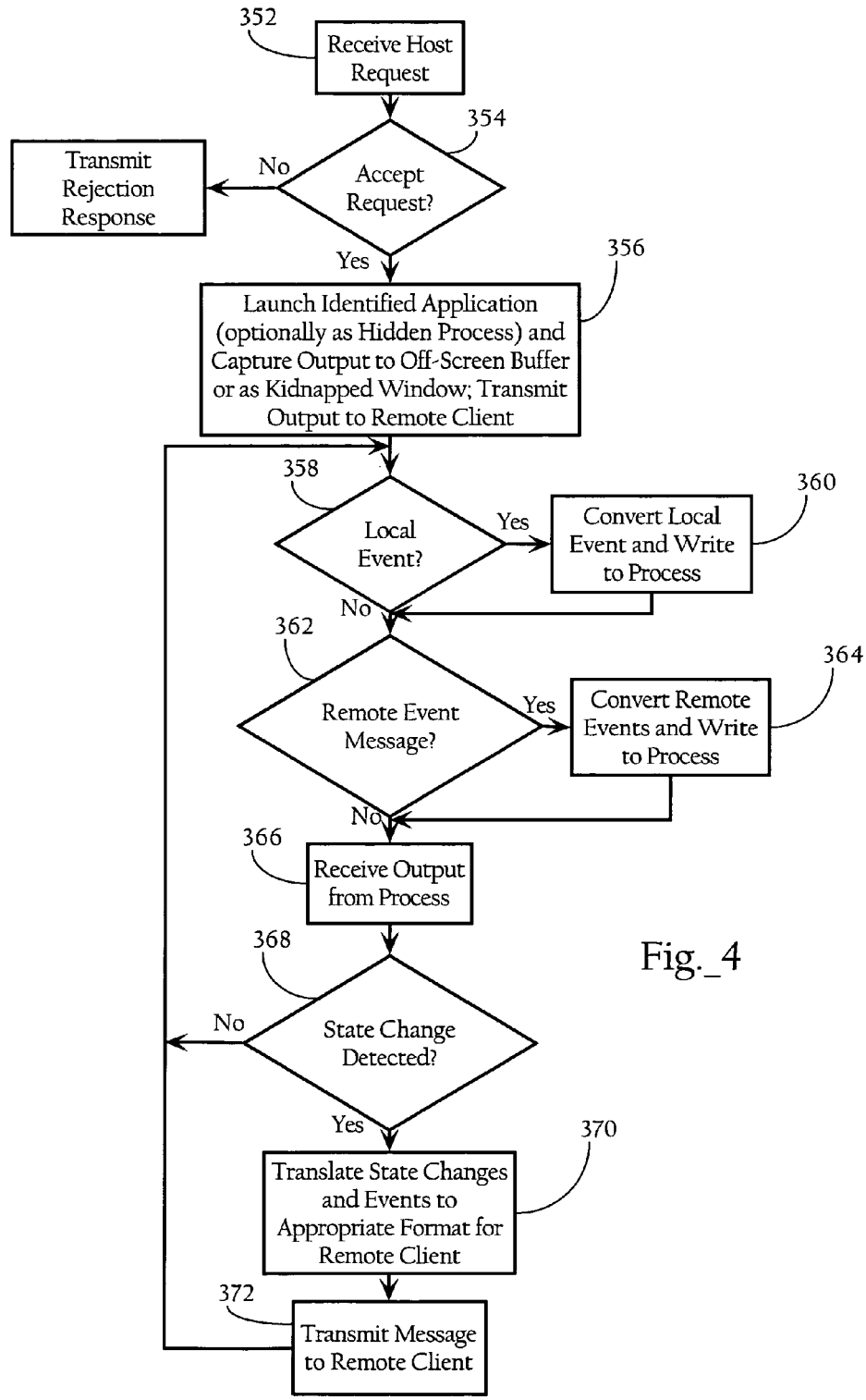
FIG. 4 is a flow chart diagram showing the initiation of a shared, virtual hosting session between a runtime engine and a thin client.

FIG. 4 illustrates a process, according to one implementation of the present invention, executed by a hosting node in the situation where a remote client does not have an installed virtual application execution engine, and a shared window session is desired. In one implementation, the hosting node receives a host request (352), and decides whether to accept the request (354). In one implementation, the hosting request identifies the application or code object to be executed and the remote client(s). The remote client may be identified based on a network address, a hostname or any other suitable identifier. In addition, a variety of factors can be used in this determination, such as whether the instant host initiated the exchange with the remote client, the load on the instant host, etc. If the host accepts the request, the virtual application execution engine on the host launches the identified application as a local process within the context of its operating system, and captures the output of process, as discussed above, to an off-screen buffer or in a kidnapped child window (whether visible or invisible) (356). As FIG. 4 shows, the virtual application execution engine on the hosting node also transmits the resulting output to the remote client identified in the hosting request.

As FIG. 4 illustrates, the virtual application execution engine on the hosting node checks for local events (such as mouse clicks, keyboard strokes, joystick movements, etc.) (358), converts the local events (as discussed above) and writes the events to the captured process (360). In addition, the virtual application execution engine also scans for remote event messages transmitted by the remote client(s) (362). As discussed in more detail below, the user on the remote client may interact with the output displayed at the remote client. These interactions—which also can be mouse clicks, keyboard strokes, and the like—are transmitted in messages, such as HTTP streams. The virtual application execution engine on the hosting node receives the event message on a socket or other connection mechanism, converts the remote events as appropriate for the native, captured process, and writes them to the captured process (364). After the virtual application execution engine receives the resulting output of the process (366), it determines whether any state changes occurred (368). If so, the virtual application execution engine on the hosting node translates the state changes and events to a format appropriate to the remote client (370), and transmits a message to the remote client (372). The message contents can vary significantly depending on the changes, the attributes of the hosted application, and/or the attributes of the remote client or client application. For example, the message contents may be include instructions describing the changes themselves, or may be an entirely re-rendered image file or map. Given the foregoing, if the hosting node is selected solely to host the application for the remote client (and no shared window session is desired), the virtual application execution engine omits the steps directed to checking for local events.

To facilitate initiation of a shared window session, in one implementation, the virtual application execution engine allows users to sign into their IM account (using public IM protocols like TOC, or a server based IM gateway for protected protocols), subsequently creating an object on the screen for each contact on the users' buddy lists, or generate a unique ID for the user (for use in a peer-to-peer or other network structure) from one or more hardware identifiers on the local system, such as hard disk drive or CPU serial numbers. A given buddy object represents a remote client, and when connected to a virtual application execution engine process or window by a user (such as dragging a buddy icon into a window or surface), makes the object's process, logic and/or window shared between the local virtual application execution engine and the remote client (spawning a new window on the remote client if the shared content or process is not already attached to a window or object on the remote client's machine).

D. Exemplary Computing Platform

Figure 5:
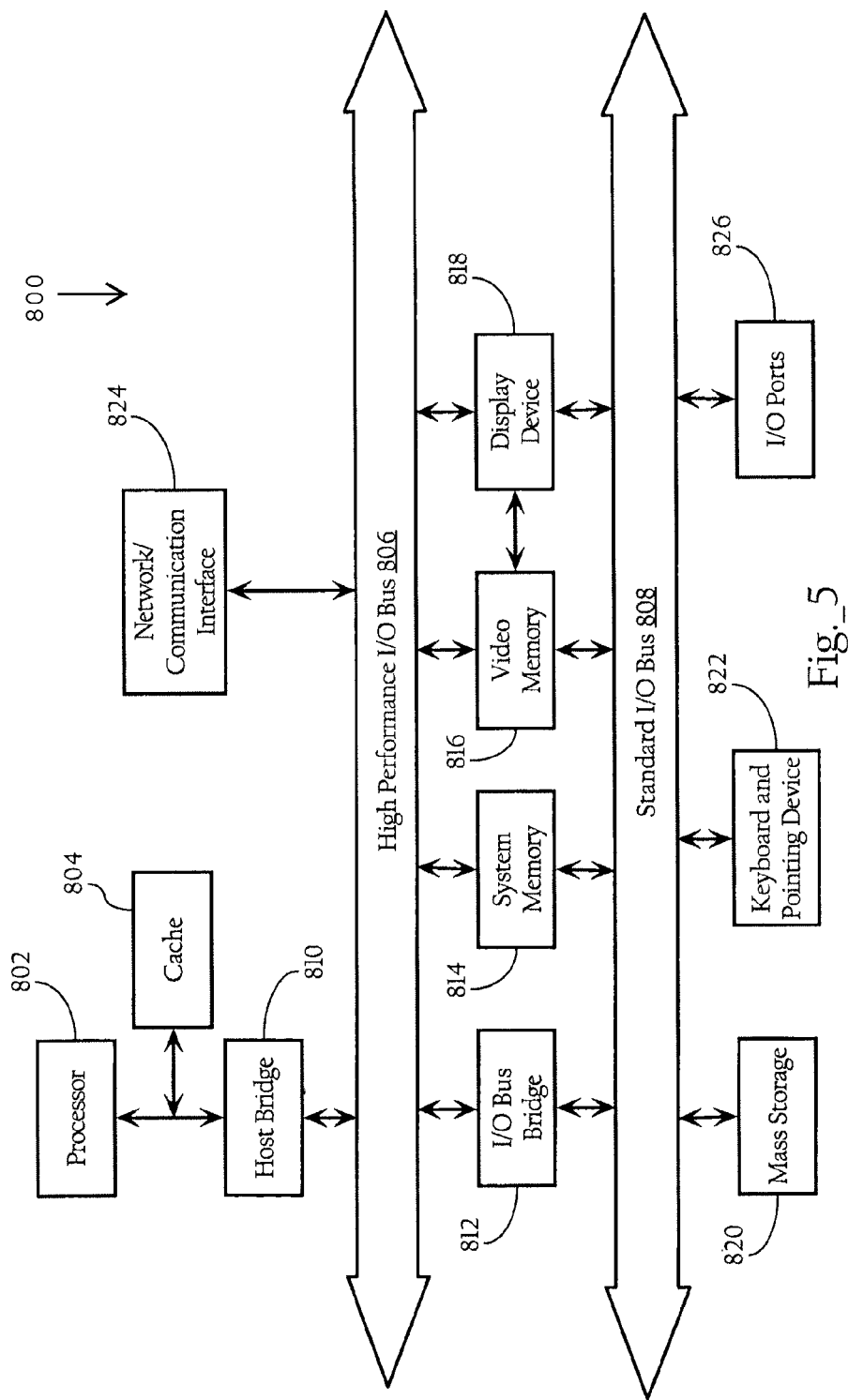
FIG. 5 is a functional block diagram setting forth one possible system architecture for a general purpose computer on which embodiments of the present invention may be executed.

Still further, in the embodiments described above, the present invention is executed within the context of a software application installed on a general purpose computer. FIG. 5 illustrates, for didactic purposes, the system architecture of a general purpose computer according to one implementation of the present invention. The present invention, however, can be implemented on a wide variety of computer system architectures. In one embodiment, the above-described system architecture operates in connection with computer hardware system 800 of FIG. 5. An operating system manages and controls the operation of system 800, including the input and output of data to and from the location diagram editing application, as well as other software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 5 illustrates one embodiment of a computer hardware system suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 800 perform their conventional functions known in the art. In particular, network/communication interface 824 is used to provide communication between system 800 and any of a wide range of conventional networks, such as an Ethernet network, a wireless (e.g., IEEE 802.11) network, etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

In one embodiment, the operations of the location diagram editing application are implemented as a series of software routines run by hardware system 800 of FIG. 5. These software routines comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In one implementation, these software routines are written in the C++ programming language and stored in compiled form on mass storage device 820. However, these routines may be implemented in any of a wide variety of programming languages, including Visual Basic, Java, etc. In alternate embodiments, the present invention is implemented in discrete hardware or firmware. For example, an application specific integrated circuit (ASIC) could be programmed with the above described functions of the present invention.

The invention has been explained with reference to specific embodiments. For example, the rendering engine and associated functionality can be implemented on a variety of computing platforms, such as dedicated gaming devices or boxes, handheld devices and the like. Other embodiments will be evident to those of ordinary skill in the art. It is therefore not intended that the invention be limited except as indicated by the appended claims.

EXE Virtual Hosting

```
// return window of a specific application process, Window
container class with target process ID passed into this call-
back:
BOOL CALLBACK ScanProcessChildProc(HWND hWnd,
LPARAM lParam
{
   OSControl* OSW=(OSControl *)lParam;
   DWORD dwProcessId;
   if (!hWnd) return true;
   if (!::IsWindow(hWnd)) return true;
   GetWindowThreadProcessId(hWnd, &dwProcessId);
   // first check the process matches
   if (OSW->m_AppID !=dwProcessId) return true;
   // second, only get the root window
   if (::GetParent(hWnd)) return true;
   // third check the window title, ignoring if Name( ) length
      <=;
   if (strlen(OSW->Name( )>0)
   {
      char name[255];
      ::GetWindowText(hWnd,name,255);
      // if the name doesn't match, then exit
      if (!strcmp(OSW->Name( ),name)) return true;
   }
   // native window handle stored back into the class if all tests
      pass
   OSW->os.window=hWnd;
   return true;
}
// Create a kidnapped window from a launched process cre-
ated from the module at the specified path
EXEHost(const char *AppName,const char* CmdLine,
const char* WndName=nil) ): CustomWindowClass( )
{
   String WEXEAndCmdLine;
   WEXEAndCmdLine=AppName;
   // build path
   WEXEAndCmdLine=" ";// optional localfolder;
   WEXEAndCmdLine+=AppName;
   if (CmdLine !=nil)
   {WEXEAndCmdLine+=" ";
      WEXEAndCmdLine+=CmdLine;
   }
   // launch process so it is hidden, and way off screen (since
      flickering may occur anyways, even if the hidden flag is
      true)
   STARTUPINFO info;
   memset(&info, 0,sizeof(info));
   info.cb=sizeof(info);
   info.wShowWindow=SW_HIDE;
   info.dwY=9000;
   info.dwX=0;
   info.dwFlags=STARTF_USESHOWWINDOW|STARTF_USEPOSITION;
   PROCESS_INFORMATION process;
   char buf[1024];
   WEXEAndCmdLine.copy(buf, 1024);
   // wait in loop until the window for the launched exe is
      found, then immediately hide its window and reattach it
      elsewhere including a web page frame
   bool            OK=CreateProcess(0,buf,0,0,false,
   DETACHED_PROCESS|NORMAL_PRIORITY_CLA
   SS,0,0,&info,&process);
   if (OK)
   {
      PostMessage(ParentWindow/*main window of the call-
         ing process*/, WM_NULL, 0, 0);
      WaitForInputIdle(process.hProcess, INFINITE);
      m_AppID=process.dwProcessId;
      os.window=nil;
      if (WndName) SetName(WndName);
```

```
else SetName(" ");
while (!os.window)
{
EnumWindows(ScanProcessChildProc,    (LPARAM)
    this);
}
PostMessage(os.window, WM_NULL, 0, 0);
}
Synch( );
// window class function to set the window invisible, just in
    case the CreateProcess function failed to do so, as it
    sometimes does depending on the environment and type
    of application launched
SetVisible(false);
}
```

What is claimed is:

1. In an application hosting engine executing within a computing environment comprising a processor, a memory connected to the processor and an operating system stored in the memory, a method for virtually executing an executable code object, comprising
receiving, by the application hosting engine, a trigger to launch an executable code object locally within the context of the operating system;
launching, by the application hosting engine, the executable code object locally as a silent process within the context of the operating system, wherein the silent process is operative to cause a root window to be created locally within the context of the operating system and render an output to the root window;
intercepting, by the application hosting engine, the output rendered by the silent process, wherein intercepting the output rendered by the silent process comprises
iteratively scanning, in response to launching the executable code object and as the executable code object launches, system windows of the operating system against a set of expected attributes to initially detect the root window, wherein the set of expected attributes comprises a process identifier, a window name and an indication of a root window; and
writing the intercepted, rendered output to an off-screen memory.

2. The method of claim 1 wherein the off-screen memory is an off-screen buffer.

3. The method of claim 1 wherein the off-screen memory is a non-viewable, managed graphics context.

4. The method of claim 1 further comprising
blitting the rendered output from the off-screen memory to the context of a rendering engine.

5. The method of claim 1 further comprising
converting the rendered output to a data stream over a communications session; and
transmitting the data stream to a remote node.

6. The method of claim 5 wherein the communications session is an HTTP session.

7. The method of claim 6 wherein the data stream is an HTML data stream.

8. The method of claim 7 wherein the HTTP session is a two-way communication with the remote node.

9. The method of claim 8 further comprising
receiving an HTTP response to the HTML data stream from the remote node; and
converting the response to at least one event; and
writing the at least one event to the silent process.

10. The method of claim 1 wherein the rendered output is a graphics context.

11. The method of claim 1 wherein the executable code object supports an external application interface, and wherein the method further comprises accessing additional functionality associated with the executable code object through the external application interface.

12. The method of claim 1 further comprising translating the rendered output stored in the off-screen memory into an HTML over HTTP stream.

13. The method of claim 1 wherein the intercepting step further comprises
changing at least one attribute of the root window to intercept the rendered output of the silent process.

14. The method of claim 13 wherein the changing step comprises
changing a first procedure pointer assigned to the root window by the operating system to a second procedure pointer.

15. The method of claim 1, wherein the root window further comprises an event loop, and wherein the method further comprises
sub-classing the event loop to intercept input events corresponding to the silent process.

16. The method of claim 5 wherein the data stream comprises a script that, when executed by the remote node, is operative to dynamically generate a two-way communications session with the remote node.

17. An apparatus for virtually executing an application, comprising:
a processor;
a memory;
an operating system stored in the memory; and
a virtual application execution engine, physically stored in the memory, comprising instructions operable to cause the processor and the apparatus to:
receive, by the virtual application hosting engine, a trigger to launch an executable code object locally within the context of the operating system;
launch, by the virtual application hosting engine, the executable code object locally as a silent process within the context of the operating system, wherein the silent process is operative to cause a root window to be created locally within the context of the operating system and render an output to the root window;
intercept, by the virtual application hosting engine, the output rendered by the silent process by iteratively scanning, in response to launching the executable code object and as the executable code object launches, system windows of the operating system against a set of expected attributes to initially detect the root window, wherein the set of expected attributes comprises a process identifier, a window name and an indication of a root window; and
write the intercepted, rendered output to an off-screen buffer in the memory.

18. The apparatus of claim 17 further comprising a network interface, and wherein the virtual application execution engine comprises a server application comprising instructions operable to cause the processor, the network interface, and the apparatus to
communicate with a remote host; and
wherein the virtual application execution engine further comprises instructions operable to cause the processor and the apparatus to
convert the rendered output to an HTML data stream over an HTTP session; and
transmitting the HTML data stream to the remote host.

19. The apparatus of claim 18 wherein the virtual application execution engine further comprises instructions operable to cause the processor and the apparatus to
- receive an HTTP response to the HTML data stream from the remote host;
- convert the response to at least one event; and
- write the at least one event to the silent process.

20. The apparatus of claim 17 wherein the virtual application execution engine further comprises instructions operable to cause the processor and the apparatus to
- change at least one attribute of the window to intercept the rendered output of the silent process.

21. The apparatus of claim 18 wherein the virtual application execution engine further comprises an instant messaging client operative to transmit a link to rendered, output stored in the off-screen buffer.

22. A non-transitory machine-readable medium comprising an application hosting engine for virtually executing a software application within the context of an operating system, the application hosting engine comprising instructions operable to cause a programmable processor to:
- receive, by the application hosting engine, a trigger to launch an executable code object locally within the context of the operating system;
- launch, by the application hosting engine, the executable code object locally as a silent process within the context of the operating system, wherein the silent process is operative to cause a window to be created locally within the context of the operating system and render an output to the window;
- intercept, by the application hosting engine, the output rendered by the silent by iteratively scanning, in response to launching the executable code object and as the executable code object launches, system windows of the operating system against a set of expected attributes to initially detect the root window, wherein the set of expected attributes comprises a process identifier, a window name and an indication of a root window; and
- write the intercepted, rendered output to an off-screen buffer or managed graphics context in a computer readable memory.

23. In an application hosting engine executing within a computing environment comprising a processor, a memory connected to the processor and an operating system stored in the memory, a method for virtually executing an executable code object, comprising:
- receiving, by the application hosting engine, a trigger to launch an executable code object locally within the context of the operating system;
- launching, by the application hosting engine, the executable code object locally as a silent process within the context of the operating system, wherein the silent process is operative to cause a window to be created locally within the context of the operating system and render a native output to the window;
- intercepting, by the application hosting engine, the native output rendered by the silent process by iteratively scanning, in response to launching the executable code object and as the executable code object launches, system windows of the operating system against a set of expected attributes to initially detect the window, wherein the set of expected attributes comprises a process identifier, a window name and an indication of a root window; and
- converting the native output of the silent process to a first network protocol stream; and
- transmitting the first network protocol stream to a remote node.

24. The method of claim 23 wherein the first network protocol stream comprises information that allows a remote node to generate an input for the silent process formatted as a second network protocol stream.

25. The method of claim 23 wherein the first network protocol stream is an HTTP stream.

26. The method of claim 23 further comprising
- receiving a second network protocol stream from the remote node, wherein the second network protocol stream comprises an input for the silent process;
- translating the input for the silent process from the second network protocol stream to a native input; and
- writing the native input to the silent process.

* * * * *